July 30, 1940. G. C. LAWSON ET AL Re. 21,518

VENETIAN SHADE

Original Filed Nov. 19, 1934

BY

INVENTORS
& GOTTFRID C. LAWSON
CARL LINDQUIST
Richey & Watts.
ATTORNEYS

Reissued July 30, 1940

Re. 21,518

UNITED STATES PATENT OFFICE 21,518

VENETIAN SHADE

Gottfrid C. Lawson and Carl Lindquist, Cleveland, Ohio, assignors to Allen B. Wilson, Evanston, Ill.

Original No. 2,111,979, dated March 22, 1938, Serial No. 103,089, September 29, 1936, which is a division of Serial No. 753,586, November 19, 1934. Application for reissue March 20, 1940, Serial No. 325,090

11 Claims. (Cl. 156—17)

This invention relates to improvements in Venetian blinds and more particularly to an improved slat for Venetian blinds.

This application is a reissue of a division of our application Serial No. 753,586, filed November 19, 1934, Patent Number 2,111,979, March 22, 1938.

Venetian blinds usually comprise an upper rail which is tiltable and having two or more ladder tapes suspended therefrom with the bottom ends of the ladder tapes connected to a lower rail. The ladder tapes carry in spaced vertical relation a plurality of slats. It is with these slats that our present invention is particularly concerned.

Heretofore the slats were made from relatively thin rectangular strips of wood, which were painted or stained the desired color. Some of the prior slats were made of laminated construction known as plywood. Wooden slats, however, have several disadvantages; they have a tendency to split, making replacement necessary, or what is the most common occurrence they warp or twist, presenting a decidedly untidy looking blind. Warping of the slats is a very common occurrence because they are subject to an unequal distribution of the rays of sunlight which very seldom encompass the entire blind and which, shining on one particular spot, causes the undesirable distortion previously mentioned. Wooden slats also are relatively expensive, and since the blinds consist mostly of slats, the cheaper the slats can be constructed the cheaper the entire blind.

In the present blind we have provided slats fabricated from metal and fiber which are extremely economical to manufacture, and wherein the attendant disadvantages enumerated above have been eliminated.

Furthermore, they do not emit an undesirable metallic sound during operation and are also much lighter in weight than ordinary types of slats.

All of the foregoing, and still other advantages, will become more apparent from the following description of some embodiments thereof, which description is illustrated by the accompanying drawing.

Figure 1:
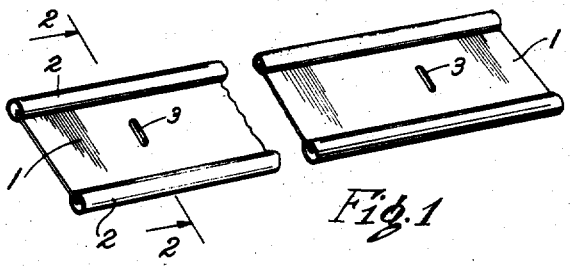
Fig. 1 is a fragmentary perspective view of a slat constructed according to our invention.

Referring to the drawing throughout which like parts are designated by like reference characters, as best shown in Fig. 1, the slat comprises a center web 1 composed of a sheet of fiber or like material. The edges of the sheet are protected and strengthened by beads 2 of metal preferably extending the entire length of the slat. Slots 3 are provided through the intermediate portion to permit cords to extend therethrough and attach to a lower rail for lowering and raising purposes, well known in the art.

Obviously, other materials than fiber may be used for the web. For instance, it might be desirable to make it of sheet aluminum when a fireproof blind is desired.

Figure 2:
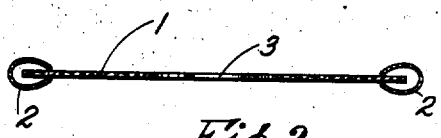
Fig. 2 is a section taken on the line 2—2 of Fig. 1.
Figure 3:
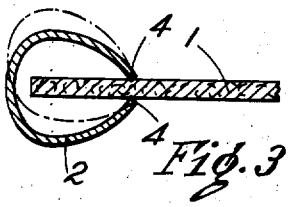
Fig. 3 is an enlarged section of the edge of the slat shown in Fig. 2.

As best shown in Figs. 2 and 3, the metal edging 2 comprises a sheet of metal bent into C or pear shaped formation with the free edges 4 extending toward each other. The free extremities of the bead edges thus present sharp edges which bite into the material of the web 1, forming their own slot or groove by compressing the material of the web.

The edge of the web extends into the bead, but does not bottom therein. It is thus possible for the bead to move slightly without twisting the web portion. This movement may cause the bead to take the position shown by the dotted lines in Fig. 3. The edges 4 of the bead securely grip the web preventing the same from being pulled off of the edge, although the bead may be moved longitudinally.

Inasmuch as the slats are used in windows, it is very seldom that the entire slat is subjected to the same conditions. The sun shining through the window seldom, if ever, shines on the whole slat. This causes various areas of the slat to be heated by the sun's rays which causes an unequal longitudinal expansion of the web and bead ordinarily causing warping or twisting. Since the bead may slide longitudinally and move arcuately relative to the web, its unequal expansion and twisting does not affect the web, and the slat therefore always remains straight and flat.

The economy of manufacture of such a slat is apparent as well as the fact that the entire slat is lighter in weight and still has the appearance of thickness that lends to its attractiveness.

Figure 4:
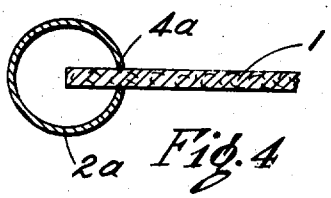
Fig. 4 is a similar view to Fig. 3 of a modified form of the invention.

In Fig. 4 we have illustrated another embodiment which operates in substantially the same manner as that just described. The bead 2ª in this instance is of circular cross section, and the edges 4ª are formed to provide a sharp edge for engagement with the web 1. Obviously, still other forms of bead could be made and still involve the same principles of operation.

Having thus described our invention, we are aware that numerous and extensive departures may be made therefrom without departing from the spirit of the invention, or the scope of the appended claims. Where reference is made, in certain of the claims, to the "side walls" of the tubes or reinforcing beads, it is understood that the walls referred to are those lying opposite the edges of the web of nonmetallic material in the direction of the plane of said web.

We claim:

1. A slat of the class described comprising a web formed of pressed board, paper or analogous material having metallic beads clamped on the edges thereof, said beads being bent into tubular formation with the contiguous edges thereof biting into the material and the side walls of the tubes being spaced from the lateral edges of the shutter.

2. A slat of the class described comprising a web formed of pressed board, paper or analogous material having metallic beads clamped on the edges thereof, said beads being bent into substantially tubular shape with the contiguous edges thereof arranged with their faces lying at diverging angles and with the inner edges thereof biting into the shutter.

3. A shutter for shades comprising a shutter proper formed of pressed board, paper or analogous fibrous material having sheet metal reinforcing beads clamped on the edges thereof, said beads being bent into tubular shape with the tube in cross section having in general a pear-shaped contour, to thereby cause the edges of the tube to more effectively bite into the shutter and at the same time embody maximum resistance to bending stresses in the walls of the tube.

4. In a slat of the class described comprising a web of fiber or analogous material having its longitudinal edges bounded by metallic beads, said beads being of tubular cross section and having oppositely disposed sharp edges adapted to grip the web spaced from the edges thereof, said beads and said web being capable of relative movement.

5. In a slat of the class described including a body of thin flat material, reinforcing edges for said web comprising metallic beads of tubular formation having inturned edges adapted to grip the web spaced from the edges of said material and formed to permit relative movement between the beads and the edges of said material.

6. In a slat of the class described, a body therefor comprising a thin flat rectangular sheet of fiber or analogous material, a reinforcing bead for said edge comprising a tubular metallic element of substantially C-shaped formation having oppositely disposed sharpened edges adapted to grip and compress the material of the web spaced from the edge, said bead being capable of relative longitudinal and rotative movement relative to said web.

7. In a slat of the class described, a web of thin flat material, reinforcing beads for the edges of the web secured to the web and spaced from said edges, the edges of the web extending into and being free from contact with said bead.

8. In a slat of the class described, a web of thin flat non-metallic material, and tubular metallic reinforcing members embracing and secured to the opposite longitudinal edge portions of said web to reinforce said web against transverse bending, said web extending into said tubular members with the marginal portions of said tubular members adjacent the points of contact of said members with said web spaced from the opposite flat surfaces of the enclosed portions of said web.

9. In a slat of the class described, a web of thin flat non-metallic material, and tubular metallic reinforcing members embracing and secured to the opposite longitudinal edges of said web to reinforce said web against transverse bending, said metallic members being formed to grip the web inwardly from its edges and to lie out of contact with said web between said edges and the places where the web is gripped.

10. A slat of the class described comprising a web formed of pressed board, paper or analogous material having metallic beads clamped on the longitudinal edges thereof, said beads being of slotted tubular formation with the contiguous edges of each tube pressed against the material inwardly from the edges of the material, the portions of said beads adjacent said contiguous edges thereof being out of contact with said web.

11. A slat of the class described comprising a web formed of pressed board, paper or analogous material having metallic beads clamped on the longitudinal edges thereof, said beads being of tubular formation with longitudinal slots in the tubes and with the metal along each edge of each slot biting into said material.

GOTTFRID C. LAWSON.
CARL LINDQUIST.